(No Model.) 2 Sheets—Sheet 2.
F. P. HINDS.
WATER FOUNTAIN.
No. 503,417. Patented Aug. 15, 1893.
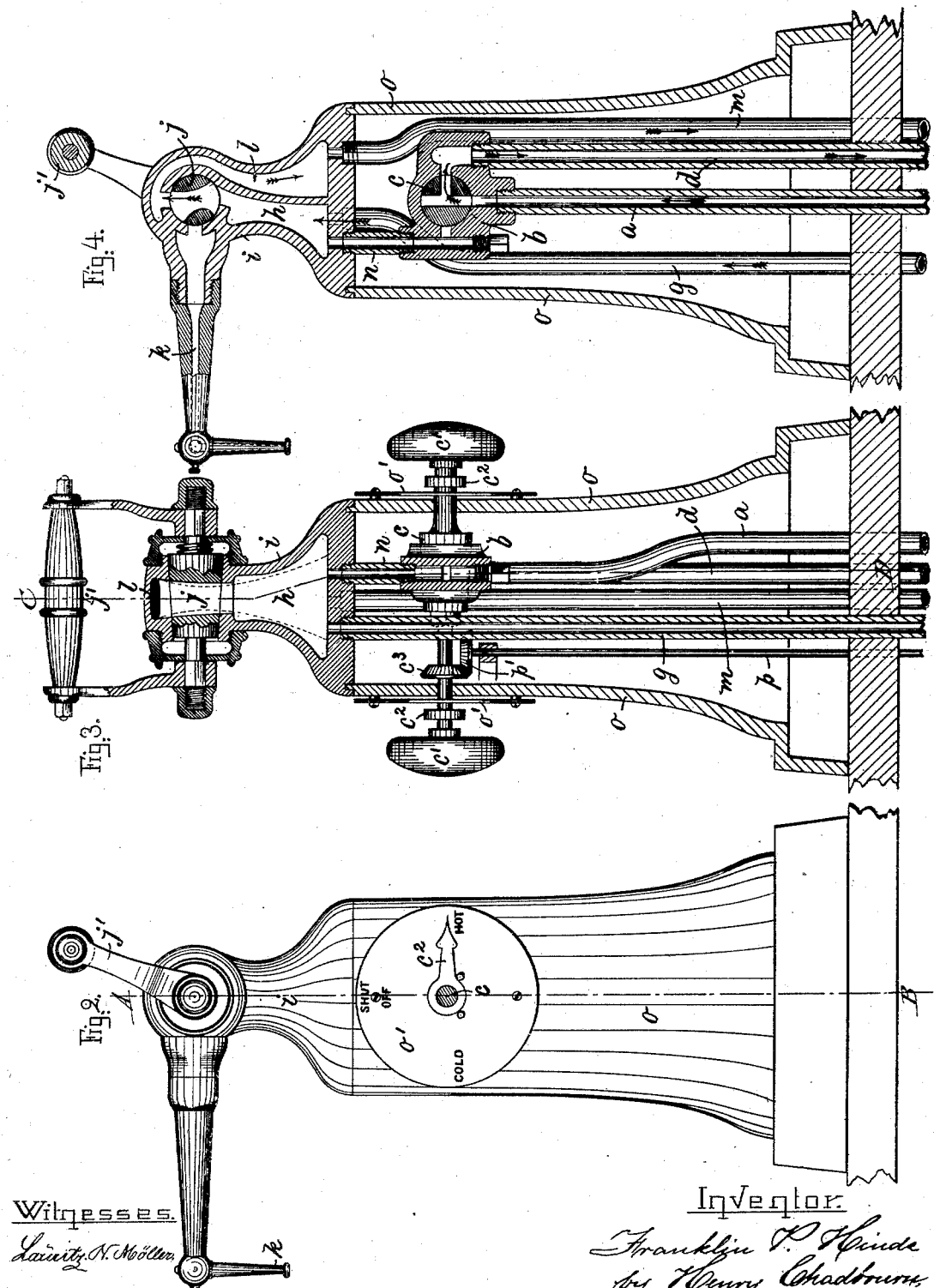
Witnesses.
Inventor
Franklin P. Hinds
by Henry Chadbourn
his Atty.

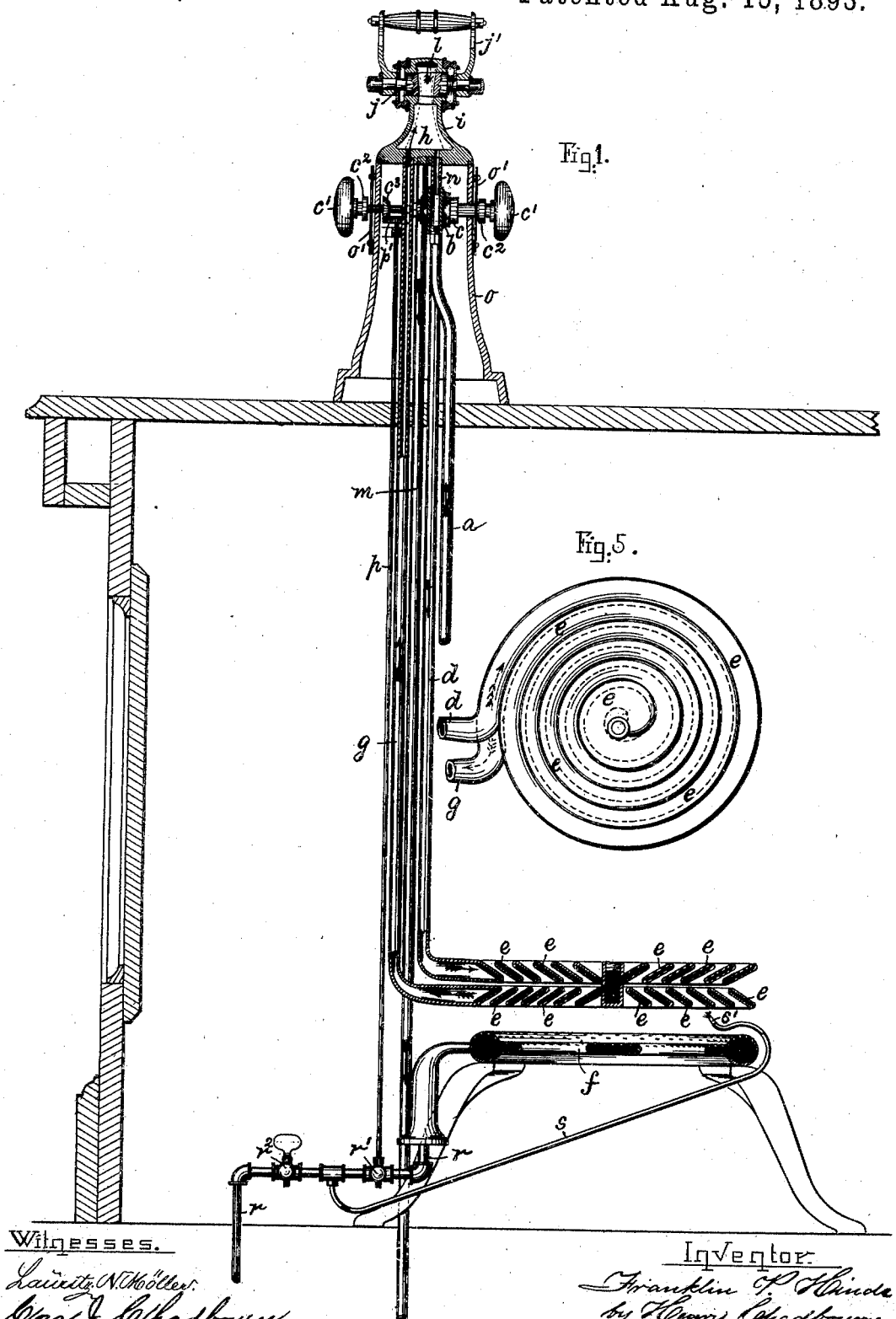

UNITED STATES PATENT OFFICE.

FRANKLIN P. HINDS, OF BOSTON, MASSACHUSETTS, ASSIGNOR TO THE HOT WATER FOUNTAIN COMPANY, OF MAINE.

WATER-FOUNTAIN.

SPECIFICATION forming part of Letters Patent No. 503,417, dated August 15, 1893.

Application filed March 15, 1893. Serial No. 466,013. (No model.)

*To all whom it may concern:*

Be it known that I, FRANKLIN P. HINDS, a citizen of the United States, residing at Boston, in the county of Suffolk and Commonwealth of Massachusetts, have invented certain new and useful Improvements in Water-Fountains; and I do hereby declare the following to be a full, clear, and exact description of the invention, such as will enable others skilled in the art to which it appertains to make and use the same.

This invention relates to improvements in water-fountains, and has for its object to provide means whereby either hot or cold water may be drawn from the same faucet in quick succession direct from the street main or other supply.

It consists in a novel arrangement of valves and pipes combined with a heater, so that the water may either be drawn from the cold water supply and discharged at that temperature from the discharge outlet of the faucet, or caused to flow through a heater of great heating capacity by the operating of a valve to change the direction of the flow of the water.

It further consists in minor details of construction, as will be set forth hereinafter, reference being had to the accompanying drawings, whereon—

Figure 1 represents a vertical longitudinal section of the fountain and its connected heater and pipes, arranged in connection with a counter. Fig. 2 represents a side elevation of the fountain alone, shown on an increased scale from that of Fig. 1. Fig. 3 represents a vertical section on the line A B in Fig. 2. Fig. 4 represents a vertical section substantially on the line C D in Fig. 3. Fig. 5 represents a plan view of one form of the heater.

Similar letters of reference denote same parts, wherever they occur on the different parts of the drawings.

The cold water supply pipe $a$ which is in open communication with the street main or with some other source of water supply under pressure is also in open communication with a passage in the valve casing $b$. This casing is provided with three passages, one of which communicates with the supply pipe $a$ as above set forth and it is also provided with a three-way spigot or valve $c$ which ways may be brought into communication with any two of the passages in the casing. One of the passages in the casing $b$ is in open communication with the pipe $d$, the opposite end of which is in open communication with the heater. This heater is composed of flattened pipes $e\ e$ in order to cause the water which flows through it to flow in a thin sheet, and it is shown on the drawings as arranged in a coil having the longest diameter of the cross sectional area of the pipes arranged inclined so that each of the coils will overhang the next coil, similar to blind slats, thus causing the heat from the gas stove to strike against the broad side of the pipes in order to concentrate and retard its rise so as to obtain the greatest effect from the heat. This heater may be made to contain one or more sections, and I have shown it on the drawings as formed of two sections arranged one above the other and having the pipes of the lower section inclined toward the center of the heater, and the pipes of the upper section inclined from the center so as to cause the heat from the stove to travel in a zigzag path and to be retarded in its rise from the stove, thus heating the water contained in the heater more quickly.

The pipe $g$ conveys the hot water from the heater to the chamber $h$ in the valve casing $i$; the pipe being in open communication with both the heater and said chamber at all times. The valve casing $i$ provided with three passages or chambers, one of which is in open communication with the pipe $g$ as above set forth and it is also provided with the two-way spigot or valve $j$ so arranged that the chamber $h$ will always be in open communication with one of the other passages in the valve casing $i$, thus forming an unobstructed passage through the valve $j$ and valve casing $i$. One of the passages in the valve casing $i$ communicates with the delivery outlet $k$ of the fountain and the other is in open communication with the vent chamber $l$, which in turn is in open communication with the vent pipe $m$. Thus it will be seen that when the valve $c$ is in the position shown in the drawings, water from the supply pipe $a$ will have an unobstructed flow through the valve $c$ and its casing, the pipe $d$, heater $e$, pipe $g$, chamber $h$, valve $j$, and, when the valve $j$ is in the position shown in the drawings through the vent chamber $l$ and vent pipe $m$ to a radiator, steam table or to any other place where it is desired to have the hot water, and if not required for use, to waste. But if the valve $j$ should be turned by its operating handle $j'$ so as to close the communication with the vent chamber $l$ and to open communication with the delivery outlet $k$ the hot water would flow through the valve $j$ and delivery outlet $k$, into a glass, pail or other receptacle which may be placed under the delivery outlet. A pipe $n$ is in open communication with the third passage in the casing $b$, and with the chamber $h$ in the valve casing $i$ and thus it will be seen that if the valve $c$ is turned one-half a revolution so as to cause the ways in said valve to be in open communication with the supply pipe passage and the passage leading to the pipe $n$ it will allow cold water to flow from the supply pipe $a$ through the valve $c$ and its casing; the pipe $n$, chamber $h$, valve $j$, and either through the vent pipe $m$ or delivery outlet $k$, according to the position of the valve $j$, but will at all times cause the water to flow from the supply pipe as the valve $j$ is so arranged that there is an open passage through said valve at all times. If it is desired at any time to prevent the flow of water from the supply pipe $a$, it is only necessary to turn the valve one quarter of a revolution from the position shown in the drawings, which will cause the ways through the valve to communicate with the passage leading to the pipes $d$ and $n$ and will close the passage leading to the supply pipe.

The valve $c$ is operated by suitable hand wheels $c'$ $c'$ mounted on the stem of the valve, which stem preferably projects on either side outside the casing $o$ of the fountain, and is provided with suitable index fingers $c^2$ $c^2$ which move over index dials $o'$ $o'$ made in one piece with or attached to the casing $o$ and preferably suitably marked to indicate the position of the valve $c$,—that is to say: whether the water supply pipe is closed or the valve is in the position to draw hot or cold water. The dials $o'$ may be provided with suitable stops to limit the movement of the index finger, if so desired, and to prevent the valve from being turned so as to connect both of the pipes $d$ and $n$ with the supply pipe at the same time.

The stem of the valve $c$ is provided with a bevel gear $c^3$ which meshes into a bevel gear $p'$ on the rod $p$. The rod $p$ is attached at its lower end to the valve $r'$ in the pipe $r$ which pipe conveys gas from a gas supply to the gas stove $f$. The gas supply pipe is provided with a second valve $r^2$ to control the flow of gas through the pipe independent of the valve $r'$ so as to be able to shut the gas off entirely from the stove, if so desired, but when the stove is to be used to heat the water in the heater the valve $r^2$ is left open, and the flow of gas through the pipe $r$ is governed by the valve $r'$. The valve $r'$ is governed by the operation of the valve $c$ through the bevel gears $c^3$ $p'$ and the rod $p$, that is to say: when the valve $c$ is in the position shown in the drawings the valve $r'$ will be open and allow a flow of gas through the pipe $r$ to the stove $f$, but when the valve $c$ has been turned one half a revolution to draw cold water, the valve $r'$ will be closed and shut off the gas from the stove. A small pipe $s$ branches from the pipe $r$ between the valves $r'$ and $r^2$ and conveys a small quantity of gas to a pilot burner $s'$, arranged in close proximity to the stove $f$. The flow of gas through the pipe $s$ is controlled by the valve $r^2$ and is independent of the valve $r'$. Thus the pilot burner $s'$ remains lighted, and it will be seen that when the gas is turned on to the gas stove it will instantly be lighted by the pilot burner.

By having the flow of gas to the stove and the flow of water to the heater governed by the operation of one valve substantially as shown no gas is wasted, as it is only used when it is desired to draw hot water from the fountain or to have hot water flow continually through the vent pipe to a radiator, steam table or whatever use desired.

By using a heater formed of flattened pipes substantially as shown, in which the water to be exposed to the heat flows in a very thin sheet will cause the water to be heated to a high temperature while it is flowing through the heater.

By having open and free vent from the heater at all times, either through the discharge outlet $k$ or vent pipe $m$ all liability of explosion caused by generating and confining steam will be obviated.

If it is desired to use the heater to produce steam to supply a steam table it is only necessary to open the valve $c$ sufficiently to allow a small quantity of water to flow to the heater which will at once be converted into steam and discharged through the vent pipe $m$ to the steam table attached thereto or wherever may be desired.

I do not wish to confine myself to the use of a gas stove to supply heat to the heater, as other means might be used to advantage, neither do I wish to confine myself to the mechanism shown for controlling the flow of gas to the stove by the operation of the valve $c$ as the same may be varied within the scope of mechanical skill without departing from my invention, as for instance the valves for controlling the flow of water to the heater and gas to the stove might be made on one and the same spigot or stem, if so desired.

Having thus fully described the nature, construction, and operation of my invention, I wish to secure by Letters Patent and claim—

1. In a water fountain a three-way valve, a water supply pipe attached thereto, a heater, communication between the valve and heater, a faucet, communication between the heater and faucet and between the valve and faucet, a vent communicating with the faucet open at all times except when drawing water from the faucet; the three-way valve governing the flow of water from the supply pipe to the faucet, either direct or through the heater according to whether hot or cold water is desired to be drawn from the faucet and also closing the water supply pipe when desired, all combined for the purpose set forth.

2. In a water fountain a three-way valve, a water supply pipe attached to the valve, a heater, a communication between the valve and the heater, a faucet, communication between the valve and faucet and between the heater and faucet, the three-way valve governing the flow of water from the supply pipe to the faucet either direct or through the heater according to whether hot or cold water is desired to be drawn from the faucet, said valve also closing the supply pipe when desired, for the purpose set forth.

3. In a water fountain, a water supply-pipe, a water heater, a faucet to draw the water from the fountain, communication between the heater and faucet open at all times, the three-way valve $b\,c$, the pipe $d$ forming communication between the valve and the heater and the pipe $n$ forming communication between the valve and faucet, whereby the water from the supply-pipe may be caused to flow from the supply-pipe to the faucet, either through the pipe $d$ and heater or direct through the pipe $n$ by the manipulations of the valve $b\,c$ according to whether hot or cold water is desired to be drawn from the faucet, combined with a gas-supply pipe, a gas stove attached to the gas supply-pipe, the valve $r'$ in the gas supply-pipe to open and close the same, the valve rod $p$, the bevel gear $p'$ on the rod and the bevel gear $c^3$ on the valve stem of the valve $b\,c$ which governs the flow of the water from the water supply-pipe meshing into the gear $p'$ whereby a flow of gas to the stove and of water to the heater is caused by the movement of the valve $b\,c$ in one direction and is discontinued by the movement of the valve $b\,c$ in the opposite direction, and a pilot burner lighted at all times to light the gas stove when gas is supplied thereto, for the purpose set forth.

In testimony whereof I have hereunto set my hand in the presence of two subscribing witnesses.

FRANKLIN P. HINDS.

Witnesses:
 FRED FARROW,
 HENRY CHADBOURN.